United States Patent [19]

Bordien et al.

[11] Patent Number: 4,483,540
[45] Date of Patent: Nov. 20, 1984

[54] OUTBOARD STERNTUBE SEAL FOR OIL-LUBRICATED BEARINGS OF SHIPS

[75] Inventors: Edgar Bordien, Hamburg; Hans-Peter Jasch, Berlin, both of Fed. Rep. of Germany

[73] Assignee: EG&G Sealol GmbH, Kelkheim, Fed. Rep. of Germany

[21] Appl. No.: 597,874

[22] Filed: Apr. 9, 1984

Related U.S. Application Data

[63] Continuation-in-part of Ser. No. 464,230, Feb. 7, 1983, abandoned.

[30] Foreign Application Priority Data

Feb. 17, 1982 [DE] Fed. Rep. of Germany ....... 3206080

[51] Int. Cl.³ ............................ F16J 9/00; F16J 15/34
[52] U.S. Cl. ............................................ 277/2; 277/65
[58] Field of Search ................................. 277/2, 3, 65

[56] References Cited

U.S. PATENT DOCUMENTS

| | | | |
|---|---|---|---|
| 3,529,835 | 9/1970 | Lewis | 277/2 |
| 3,547,452 | 12/1970 | Hirata | 277/65 |
| 3,591,188 | 7/1971 | Eisner | 277/65 |
| 4,268,232 | 5/1981 | Haupt | 277/65 |
| 4,299,398 | 11/1981 | Wahl | 277/65 |
| 4,313,608 | 2/1982 | Scott | 277/65 |
| 4,410,188 | 10/1983 | Copes | 277/65 |
| 4,434,986 | 3/1984 | Warner | 277/65 |

Primary Examiner—Robert I. Smith
Attorney, Agent, or Firm—Ralph L. Cadwallader; Robert P. Cogan; Leo M. Kelly

[57] ABSTRACT

The invention relates to an outboard sterntube seal, for the oil-lubricated propeller shaft bearings of a ship, which is equipped with a water-side seal and an oil-side seal separated by a cavity provided with a drain duct leading into the interior of the ship to permit monitoring of the seal. Both the water-side seal and the oil-side seal are in the form of rotating mechanical seals which each include a slipring and a counterring, the oil-side seal being designed in such a manner that in the event of failure of the water-side seal the sealing surface of the oil-side slipring is loaded additionally in its direction of closure through a retaining ring by the water pressure prevailing in the cavity. The sterntube seal is also equipped with additional elements that elastically accommodate movement of the shaft and seal the cavity against oil and water. The sliprings and counterrings of the rotating mechanical seals each have at least two independently removable and circumferentially extending parts. This permits the pollution of sea water to be prevented with optimal certainty through the use of low pressure lubricating oil, and it renders unnecessary docking of the ship previously required for the purpose of carrying out repairs.

10 Claims, 1 Drawing Figure

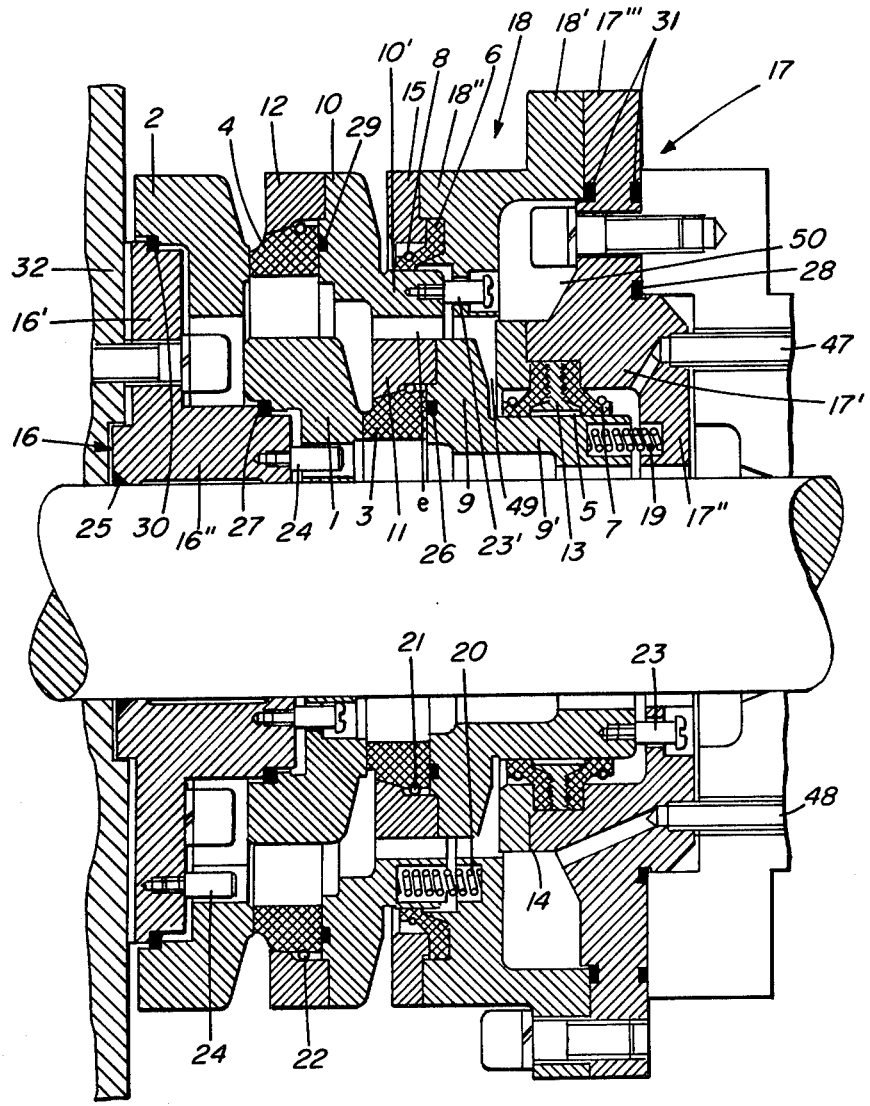

OUTBOARD STERNTUBE SEAL FOR OIL-LUBRICATED BEARINGS OF SHIPS

This application is a continuation-in-part of application Ser. No. 464,230 filed Feb. 7, 1983 and now abandoned.

The invention relates to an outboard sterntube seal for oil-lubricated bearings of ships.

The propeller shaft of a ship is passed into the open to accept the driving propeller by a sterntube mounted in the rear of the ship. The shaft is accommodated within the sterntube in an oil-lubricated bearing which is provided with seals on both sides to prevent the lubricating oil from escaping. One of these seals, which is located inside the ship near the sterntube, presents no particular problems, since in this seal only the escape of lubricating oil from the bearing must be prevented. The other seal, however, which lies outside the ship and is referred to as an "outboard seal", presents a problem, since sea water impinges upon it from the outside, so entry of the sea water must be prevented in order to protect the bearing from the sea water. The outboard sterntube seal must therefore be provided with two seals: a water-side seal to prevent the entry of sea water, and an oil-side seal to prevent the escape of oil from the bearing. In the interest of the ship's operational reliability, protecting the bearing against the entry of sea water is of primary importance.

In a known outboard sterntube seal a combination of sealing lips is employed which bear upon a shaft bushing. In this design the outer sealing lips are intended to prevent the entry of sea water and the inner sealing lips, the escape of oil. In order to reliably make the entry of sea water impossible in the event of damage to or wear of the lip seals, application is made of pressure lubrication for the sterntube bearing, in which oil is fed through the bearing on a circulating basis at a pressure that exceeds that of the sea water, so that in the event of leakage no sea water is able to enter the bearing. However, in this case it is accepted that during operation, as a result of inevitable wear of the sealing lips, a certain amount of oil will escape into the sea water, which is dependent upon the diameter of the shaft in question and can assume substantial proportions on the course of a trip. This known sterntube seal therefore conflicts with today's regulations and endeavours to establish effective environmental protection, not to mention the fact that as a result of the high pressure load on the sealing lips an expensive cooling and lubricating system is required.

Another outboard sterntube seal attempts to take into account the now generally accepted need for ecologically beneficial and oil-conserving operation. In this known type the water-side seal is separated from the oil-side seal by an annular-section cavity, and the water-side seal consists of a rotating mechanical seal designed as an axial seal while the oil-side seal consists of a lip seal resting upon a shaft bushing which has two lips facing each other that form an annular hollow space. From a storage tank producing a desired oil pressure the oil is fed to the bearing. It enters the hollow space beneath the adjacent sealing lip and fills this space. The other sealing lip forms the seal on the opposite side of the hollow space. The cavity located between the two seals permits monitoring and detecting any leakage that may occur. If the oil-side seal develops a leak, oil enters the cavity past the sealing lip facing the cavity and is conducted by a drain pipe into the interior of the ship, the oil-side leak in this way indicating that oil is flowing from the drainpipe into a retaining tank. When water-side leakage occurs, sea water enters the cavity and mixes with the oil leaking from the annular space between the sealing lips under the lip seal facing the cavity so that water containing oil flows from the cavity drainpipe. Since in operation leakage always increases, the stream consisting of water and oil conducted from the cavity drainpipe into the ship's interior constantly increases in volume. It must constantly be drained outboard with a bilge pump, possibly through an in-line oil filter. Closing the cavity drainpipe is impossible, since then the pressure of the water in the cavity would increase to such an extent that the oil-side seal would completely fail, with the result that water would enter the sterntube bearing. For this reason ships equipped with this known seal must call at the next port for repair of the outboard seal. When water-side leakage occurs there is nevertheless nothing to prevent oil from escaping outward from the water-side seal, so with this known seal as well, pollution of sea water by escaping oil cannot be prevented.

The known outboard sterntube seals described above have another serious disadvantage in that repairs required for the purpose of eliminating leakage necessitate the removal of either the shaft or the propeller for replacement of the sealing lips and possibly also the shaft bushing. Such repairs can only be carried out in a drydock, which entails great expense and requires a period of several days.

In view of the prior art described above, objects of the invention are to create an outboard sterntube seal in which pollution of sea water by oil escaping from the seal is prevented with optimal certainty through the use of unpressurized oil, and in which docking of the ship for the purpose of carrying out repairs is unnecessary.

These objects are achieved in accordance with the present invention which provides an outboard sterntube seal for an oil-lubricated propeller-shaft bearing in the sterntube of a ship comprising coaxially arranged and axially separated oil-side and water-side seals connected by an annular-section cavity such that water or oil leakage past the oil-side and water-side seals can be conducted away through the cavity into the ship's interior, characterised in that both oil-side and water-side seals are rotating mechanical seals in which a counterring supports a slipring so as to provide radial clearance between the slip ring and the shaft; the slipring of the oil-side seal has a sealing surface which is loaded in its direction of closure by a first retaining ring in the event of failure of the water-side seal as a result of the water pressure prevailing in cavity; the sterntube seal is provided with additional elements which elastically accommodate movement of the shaft and seal the cavity against oil and water.

The invention is based on the finding that when not only, as is known, the water-side seal, but also the oil-side seal, that is, both seals, are in the form of rotating mechanical seals, the possibility exists with suitable design of using the oil-side rotating mechanical seal as an adequate replacement for the damaged water-side rotating mechanical seal, since the sealing surface of the slipring in the oil-side rotating mechanical seal may be loaded in its direction of closure by its retaining ring by the water pressure prevailing within the cavity, so that under the effect of the sea water that has entered the cavity the oil-side rotating mechanical seal is loaded by the sea water in the same manner as the damaged water-side rotating mechanical seal and assumes the role of a second converted water-side rotating mechanical seal. Operation may therefore be continued even after failure of the water-side rotating mechanical seal without oil from the sterntube seal being able to escape. In this event the sliding surface of the rotating mechanical seals lying perpendicular to their axis are protected against any motion or oscillation of the propeller shaft that may occur by elements according to the invention which elastically accommodate these motions and which at the same time seal the cavity constantly against penetration by oil or water. According to the invention the oil-side rotating mechanical seal is therefore designed in such manner that it can withstand pressure loading from both sides, that is, from the oil-side and from the water-side, and in the event of failure of the water-side rotating mechanical seal a drainage duct leading from the cavity can be closed so that the oil-side rotating mechanical seal serves fully as the sea water seal.

In a preferred embodiment of the invention, the slipring of the oil-side seal forms part of an axially-movable sub-assembly; the sub-assembly has first and second transversely-extending, axially-facing, projected areas which, in the event of failure of the water-side seal, are exposed to the pressure of water within the cavity; and the first projected area, which is directed in the opposite direction to the sealing surface of the slipring of the oil-side seal, is larger than the second projected area, which is directed in the same direction as the sealing surface of the slipring of the oil-side seal, so that the force tending to press the counterring and the slipring of the oil-side seal together equals the product of the pressure of water within the cavity and the differential area by which the first projected area exceeds the second projected area.

The differential area may be as high as 70% of the sealing surface of the oil-side seal and, in one practical embodiment of the invention the double load-carrying capacity of the oil-side rotating mechanical seal is achieved and ensured by making the outer diameter of a ring collar of a retaining ring for the oil-side slipring greater than the inner diameter of the sliding surface of the slipring, but less than the outer diameter of the sliding surface of this slipring. The ring collar of the retaining ring for the oil-slide seal is under the influence of the low-pressure oil supplied and under the influence of a compression spring means. Normally, that is, if the water-side rotating mechanical seal is intact, the cavity is unfilled, and the oil-side slipring is acted upon only by the relatively slight pressure of the oil and the compression spring; this slight pressure load is sufficient to reliably prevent escape of oil into the cavity past the oil-side slipring. For this reason it is desirable for the outer diameter of the ring collar of the retaining ring to be made only slightly greater than the inner diameter of the sliding surface of the slipring, so that the differential area equals by far the greater portion of the sliding surface in the event of breakdown of the water-side rotating mechanical seal. In this event the cavity fills with sea water, and the sea water passes to the rear of the retaining ring, so that when the cavity drainage duct is closed the full sea water pressure acts upon the retaining ring in the direction of closure of the oil-side rotating mechanical seal, and from this point on the latter takes on the function of the failed water-side rotating mechanical seal. As a result of this sterntube seal design continuation of operation is possible without interruption in the event of failure of the water-side rotating mechanical seal, since from this time on, entry of water into the bearing is reliably prevented.

The two sliprings and their two counterrings each preferably consist of at least two independently removable, circumferentially extending parts which are held together, in operation, by suitable clamping means. Because of this split design of the slipring and counterring of both rotating mechanical seals, repair and replacement of these parts is possible without the necessity of removing the propeller shaft or the propeller. Repair can either be carried out by divers with the ship in the water, or the ship can be trimmed front-heavy to the degree that the sterntube seal is freely accessible from outside. All that is necessary for repair is removal from outside of the parts in question and replacement of the worn parts.

The appended illustration shows an exemplary embodiment of the invention.

The FIGURE shows a view in longitudinal section through the outboard sterntube seal.

The shaft propeller 32 is attached at the left side of the illustration, and the rear of the ship attaches to the right side of the illustration.

Fastened with bolts to the propeller 32 is an L-shaped hub 16. Hub 16 has a flange 16' extending perpendicularly to the shaft and a sleeve 16'' extending parallel to the shaft. To flange 16', using an O-ring seal 30, is attached a counterring 2 of a water-side rotating mechanical seal, 2,4 and to sleeve 16'', likewise using an O-ring seal 27, is attached a counterring 1 of an oil-side rotating mechanical seal, 1,3. Counterrings 1, 2 are connected by driving pins 24 in the direction of rotation to hub 16 and so they undergo rotation with the propeller.

Attached to the ship wall is a housing comprising first and second sections 17 and 18. First housing section 17 is bolted to the rear of the ship with O-ring seals 28, 31 interposed between the two, while second housing section 18 has a sleeve 18'' and is connected rigidly to first housing section 17 with an O-ring seal 31 interposed. First housing section 17 forms in its central area a sleeve 17', to which are connected an inwardly directed flange 17'' and an outwardly directed flange 17'''. Connected to flange 17'' by first driving pins 23 and first compression springs 19 is a first retaining ring 9 which possesses a ring collar 9' that engages sleeve 17'. The end of ring collar 9' is engaged by first compression springs 19 and first driving pins 23. At the face of first retaining ring 9, sealed to the latter with an O-ring seal 26, is a slipring 3 for the oil-side seal 1,3. Slipring 3 is held by a first thrust collar 11 which surrounds the latter and is bolted to a first retaining ring 9. The outer perimeter of slipring 3 has a conically tapered surface that engages a corresponding conical surface of first thrust collar 11 in such a manner that when the latter is bolted to first retaining ring 9, slipring 3 is forced against the face of first retaining ring 9. First springs 19 hold slipring 3 in position against counterring 1 by means of first retaining ring 9. Positioned between the perimeter of ring collar 9' and sleeve 17' of first housing section 17 is a double lip packing 5 equipped with a first clamping ring 14. Both lips of double lip packing seal 5 point outward and are held in contact with the perimeter 13 of ring collar 9' by a circular spring clip 7. To sleeve 17' of first housing section 17 connects an oil supply duct 47, by which low pressure oil is fed into sleeve 17' between first springs 19 and double lip packing seal 5. This oil fills the annular space surrounding the shaft and is prevented from leaving this annular space by packing seal 5, O-ring seal 26, rotating mechanical seal 1,3, and O-ring seal 27. Double lip packing seal 5 engages a recess in sleeve 17' and is retained by the first clamping ring 14.

Second housing section 18, which is secured to flange 17'''' of housing first section 17 by means of flange 17''', includes a sleeve 18'' which is engaged by the ring collar 10' of a second retaining ring 10. Ring collar 10' is connected flexibly in an axial direction to sleeve 18'' by second driving pins 23' and second compression springs 20, and between the circumferential surface of ring collar 10' and sleeve 18'' is packing seal 6, whose lip is held in position against the circumferential surface of ring collar 10' by a circular spring clip 8. Packing seal 6 is located in a recess in sleeve 18'' of second housing section 18 and held therein by a second clamping ring 15. Positioned against the face of second retaining ring 10 is a slipring 4, which together with its counterring 2 forms the water-side rotating mechanical seal 2,4. Between slipring 4 and the face of second retaining ring 10 is an O-ring seal 29. Slipring 4 has on its perimeter a conically tapering surface that is connected to a corresponding conical surface of a thrust collar 12 in such a manner that thrust collar 12 holds slipring 4 in position against the face of retaining ring 10.

Sliprings 3 and 4 of the oil-side and water-side seals 1,3 and 2,4 both comprise two independently removable, circumferentially-extending parts which are held together by circular spring clips 21 and 22. Counterrings 1 and 2, like their sliprings 3 and 4, also both comprise two independently removable circumferentially-extending parts, held together by clamping means (unshown), and the counterrings 1 and 2 are held against rotation relative to the sleeve 16'' and the flange 16, respectively, of the hub 16 by means of locking pins 24 and 24', respectively. Bolts, only one of which is shown, in part, connect the propeller 32 to the hub 16. Packing seals 5,6 together with O-ring seals 26,27,29,30 form an elastic system that absorbs and compensates for operational oscillations of the propeller shaft occurring in a transverse direction and in an axial direction so that rotating mechanical seals 1,3;2,4 cannot be adversely affected; at the same time, the sealing system provides reliable sealing of cavity e against leakage from both the oil-side and the water-side seals.

Cavity e extends from hub 16, which rotates with the shaft, to first housing section 17 and forms a continuous annular space of varying cross-sectional size which leads into an annular chamber 50 to which is connected a drainage duct 48 leading into the interior of the ship and permitting monitoring of the sterntube seal and detection of any leaks that may occur. Cavity e includes a pocket 49 that extends behind first retaining tube 9 and continues to the outer perimeter of collar 9' of first retaining ring 9.

The method of operation of the sterntube seal, is as follows. Low pressure oil is fed from a storage tank through duct 47 into sleeve 17' of first housing section 17. The oil flows around the first springs 19 into the annular space immediately surrounding the propeller shaft until it reaches O-ring seal 27. The right lip of double lip packing seal 5 and O-ring seal 27 seal cavity e against the oil, so only in the event of a leak occurring in rotating mechanical oil-side seal 1,3 can the oil enter cavity e. In this event, in the course of time oil fills the annular chamber 50 and is drained by drainage duct 48, thereby indicating to the service personnel that an oil leak is present. The oil draining from drainage duct 48 is collected inside the ship, and the oil level of the storage tank is maintained constant by adding oil as necessary so that the sterntube seal remains operable by virtue of the intact state of rotating mechanical water-side seal 2,4 until an opportunity arises from repairing the oil leak. When both oil-side and water-side rotating mechanical seals 1,3;2,4 are working perfectly, cavity e remains free of fluid and slipring 3 experiences only the pressure effect of the oil and of first springs 19, which act upon the sliding surface of slipring 3. This slight pressure load is sufficient to prevent entry of the oil into the cavity e. If water-side rotating mechanical seal 2,4 fails, water enters cavity e and fills the latter, in which case the occurrence of the water leak is detected by means of drainage duct 48 which is then closed with the result that the water pressure increases in cavity e. In this event the water pressure in pocket 49 of the cavity e acts on the rear of first retaining ring 9 with the result that the water pressure acting on rotating mechanical seal 1,3 is sufficient to prevent leakage through the latter. In this way oil-side rotating mechanical seal 1,3 constitutes in full measure, a replacement for failed water-side rotating mechanical seal 2,4, so that even after failure of water-side rotating mechanical seal 2,4 the sterntube seal can continue to be utilized until an opportunity presents itself for repair, which can be accomplished, for example, on the occasion of docking of the ship carried out at regular intervals.

When repair is required, rotating mechanical 2,4 is opened against the effect of first and second springs 19, 20, whereupon countering 2, consisting of two sections, is released and removed. Then thrust collar 12 is detached from retaining ring 10 and shifted to the left so that slipring 4, which consists of a plurality of segments, can be replaced. Replacement of rotating mechanical seal 1,3 can be undertaken by further dismantling the sterntube seal.

In summary, the advance represented by the outboard sterntube seal according to the invention in relation to prior art is that escape of oil into the sea water and entry of sea water into the bearing after failure of the water-side rotating mechanical seal is prevented by the oil-side rotating mechanical seal assuming the complete function of the failed water-side rotating mechanical seal, so that operation of the ship can be continued even after failure of the water-side rotating mechanical seal, which is not possible with known types of seals. In addition, when repair is required the wearing parts of the sterntube seal may be replaced in a simple manner without having to remove the propeller shaft or the propeller, which is required with known seals.

We claim:

1. An outboard sterntube seal, for an oil-lubricated propeller shaft bearing in the sterntube of a ship, comprising:

coaxially arranged oil-side and water-side seals axially separated by an annular cavity having a drain that conducts water or oil leaking past the oil side and water-side seals through the cavity into the ship's interior;

said oil-side and water-side seals being rotating mechanical seals each having a counterring supporting a slipring to provide radial clearance between the slipring and the shaft;

the slipring of the oil-side seal having a sealing surface which is loaded in its direction of closure by a first retaining ring which is subject to water pressure prevailing in said cavity when said water-side seal fails; and additional elements which elastically accommodate movements of the shaft and seal said cavity against oil and water.

2. A seal according to claim 1 in which the oil-side seal has a slipring, first retaining ring and thrust collar forming an axially-movable sub-assembly;

said sub-assembly has first and second transversely-extending axially-facing, projected areas which, in the event of failure of the water-side seal, are exposed to the pressure of water within said cavity;

the first projected area is greater than the second projected area, so that the force tending to press the counterring and the slipring of the oil-side seal together equals the product of the pressure of water within said cavity and the differential area by which the first projected area exceeds the second projected area.

3. A seal according to claim 2 in which:

an L-sectioned hub is provided for attachment to the ship's propeller;

said hub has a radially extending flange which supports the counterring of the water-side seal and an axially extending sleeve, which supports the counterring of the oil-side seal; and resiliently deformable ring seals are disposed, respectively, between said sleeve and the counterring of the oil-side seal and between the flange and the counterring of the water-side seal.

4. A seal according to claim 3 in which:

a two-part housing is provided for attachment to the hull of the ship; and said two-part housing supports the sliprings of the oil-side and water-side seals and encloses at least part of said cavity.

5. A seal according to claim 4 in which:

said housing includes a first housing section abutting the hull of the ship and a second housing section:

the first housing section having an axially-extending sleeve, an inwardly-directed flange and an outwardly-directed flange;

the second housing section having a flange attached to the outwardly-directed flange of the first housing section and a sleeve; and a second retaining ring supporting the slipring of the water-side seal and having a ring collar mounted within the sleeve of the second housing section.

6. A seal according to claim 5 in which:

the first retaining ring supports the slipring of the oil-side seal and has a ring collar mounted within the sleeve of the first housing section;

the first retaining ring is positively connected in a rotational sense to the inwardly directed flange of the first housing section by means of a first driving pin and is flexibly connected in an axial sense to said inwardly directed flange of said first housing section by means of a first compression spring which also serves to press the slipring and the counterring of the oil-side seal together;

a double lip packing seal is disposed between the sleeve of the first housing section and the first retaining ring and is provided with outwardly directed lips;

a first clamping ring connects the double lip packing seal to the sleeve of the first housing section; and a first thrust collar and the slipring of the oil-side seal having engaging complementary conically-shaped surfaces whereby the first thrust collar connects the slipring of the oil-side seal to the first retaining ring.

7. A seal according to claim 6 in which the sealing surface of the oil-side seal is annular in shape and the outer diameter of the ring collar of the first retaining ring is greater than the inner diameter of said sealing surface but less than the outer diameter of said sealing surface.

8. A seal according to claim 7 in which:

the ring collar of the second retaining ring is positively connected in the rotational sense to the sleeve of the second housing section by means of second driving pins and is flexibly connected in an axial sense to the sleeve of the second housing section by means of second compression springs which, with first compression springs, serve to press the counterring and the slipring of the water-side seal together;

a second packing seal is disposed between the sleeve of the second housing section and the second retaining ring;

a second clamping ring connects said second packing seal to the sleeve of the second housing section; and a second thrust collar and the slipring of the water-side seal have engaging complementary conically-shaped surfaces whereby the second thrust collar connects the slipring of the water-side seal to the second retaining ring.

9. A seal according to claim 8 in which an oil supply duct is communicatively connected to a space which is encircled by and sealed by said oil-side seal.

10. A seal according to claim 9 in which the two counterrings and the two sliprings each consist of at least two independently removably, circumferentially-extending parts.

* * * * *